Patented Jan. 15, 1935

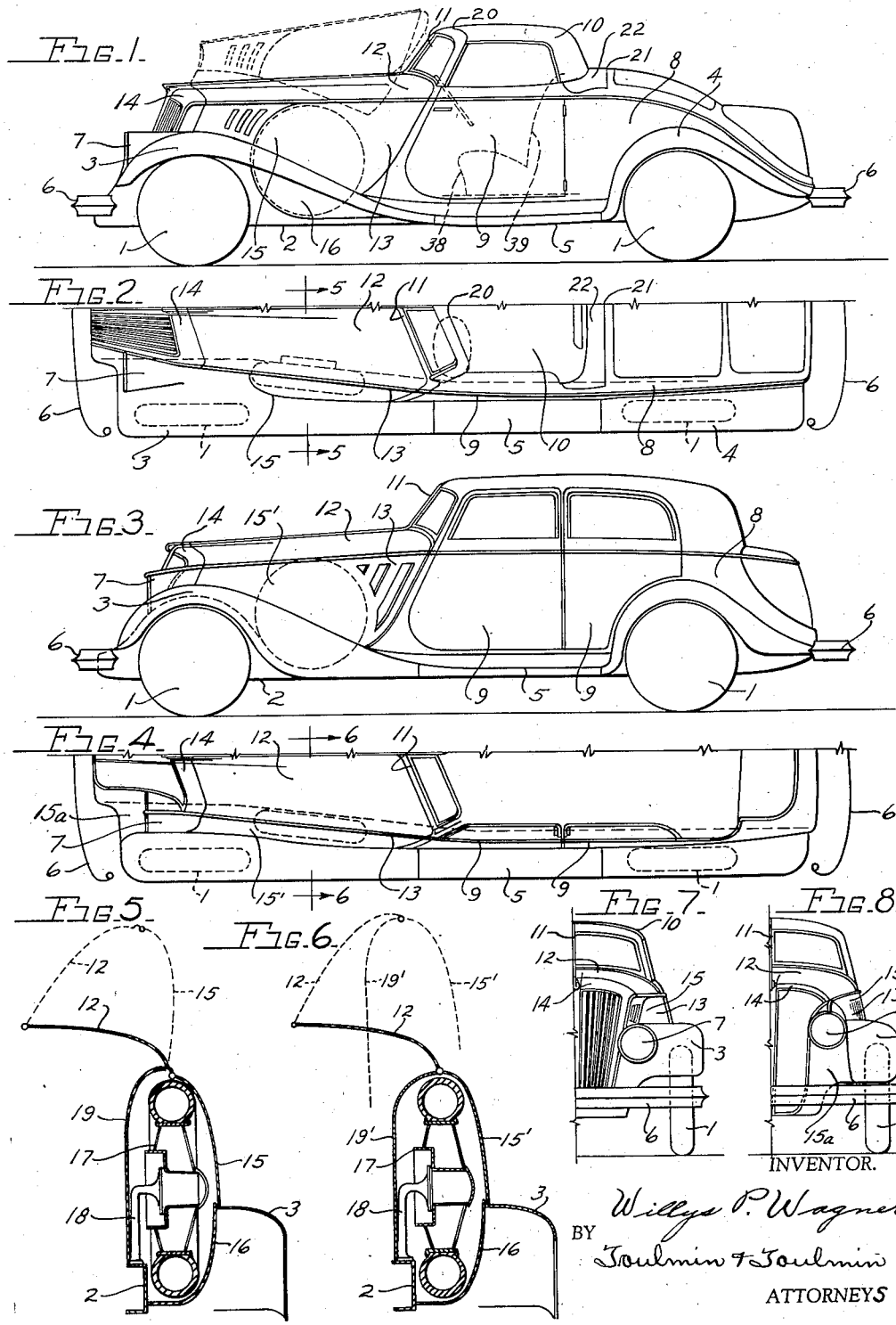

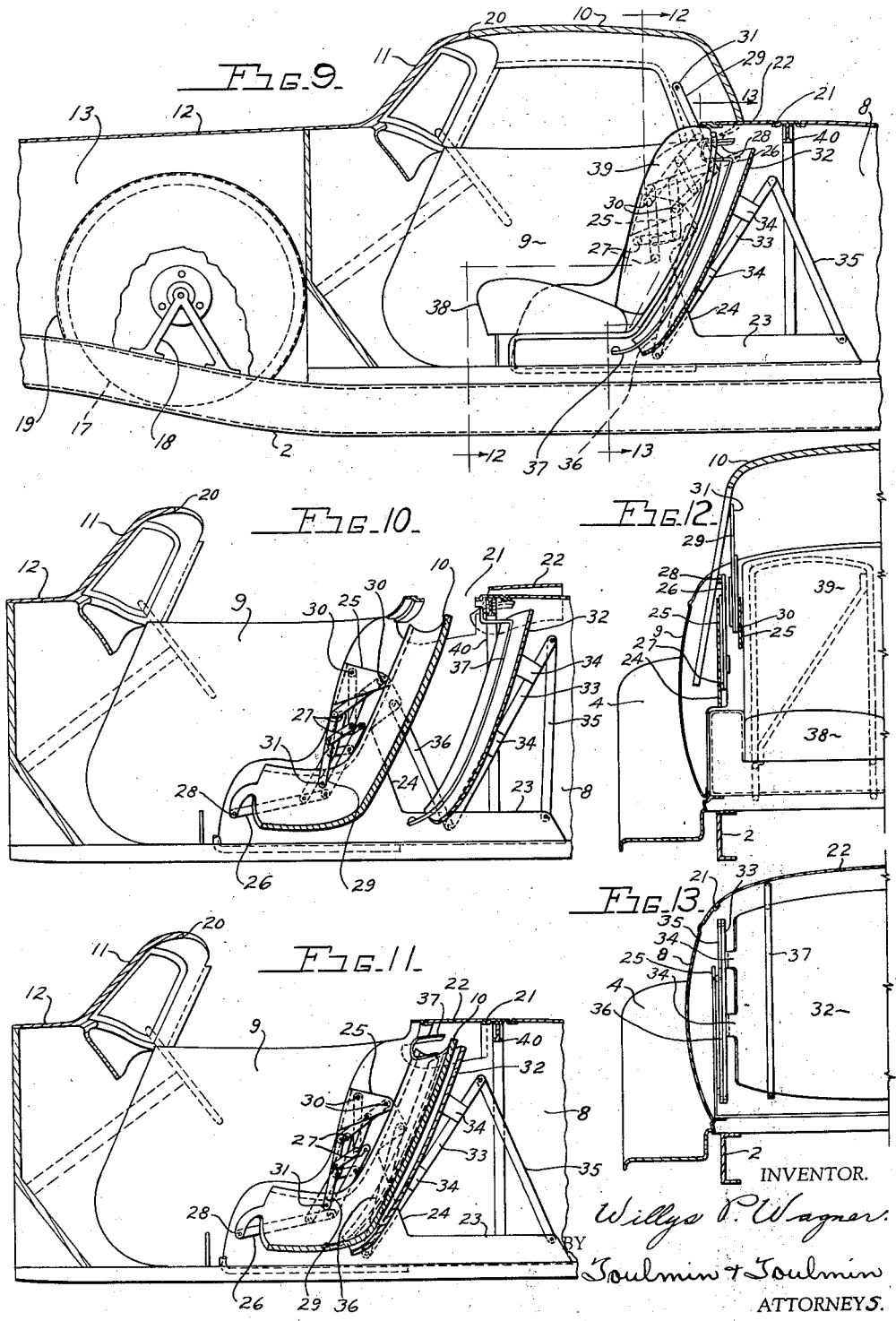

1,988,346

UNITED STATES PATENT OFFICE 1,988,346

AUTOMOBILE BODY CONSTRUCTION

Willys P. Wagner, Terre Haute, Ind.

Application February 16, 1933, Serial No. 657,056

5 Claims. (Cl. 296—107)

This invention relates to improvements in automobile bodies, and has for its object to provide an automobile body that is streamlined throughout and may have a rigid, disappearing top and a compartment in the body for housing the top.

In carrying out the streamline construction of the body the fenders are so attached to the body and the hood that the least amount of resistance to the air is encountered. In order to further diminish the resistance of the air a spare wheel, usually transported on the front fender, is located within a pocket or compartment provided therefor in the hood, between the hood and the motor, with a wheel protecting plate between the wheel and the motor.

It is also an object of this invention to provide an automobile body having a seat compartment, a top-receiving compartment immediately behind the seat compartment, and a rigid top articulately connected to the body so it may assume a horizontal position over the seat compartment, or it may be inserted within the top compartment and inclosed therein.

It is also an object of this invention to provide a V-shaped windshield to which one end of the top is attached, or which supports one end of the top.

It is a further object of this invention to provide, in connection with a body having a top-receiving compartment therein, a closure for the compartment supported and operated by a guide and support member for guiding and supporting the top when it is inserted in the top-receiving compartment.

These and other objects and advantages will appear from the following description taken in connection with the drawings.

Referring to the drawings:

Figure 1 is a side elevation of a coupé constructed in accordance with the present invention.

Figure 2 is a half plan view of the automobile shown in Figure 1.

Figure 3 is a side elevation of a sedan, in which the side and front of the hood are streamlined, with the headlight located in front of the hood.

Figure 4 is a half plan view of the car shown in Figure 3.

Figure 5 is a section on the line 5—5 of Figure 2.

Figure 6 is a section on the line 6—6 of Figure 4.

Figure 7 is a front elevation of the half of the car shown in Figure 2.

Figure 8 is a front elevation of half of the car shown in Figure 4.

Figure 9 is a longitudinal section through the body showing the seat compartment, the top-receiving compartment, the articulated mechanism for supporting and guiding the top, and the closure for the top compartment.

Figure 10 is a section similar to that shown in Figure 9, with the top housed in the top-receiving compartment but with the closure therefor in an open position.

Figure 11 is a view similar to Figure 10 but with the closure for the top compartment in a position to close the compartment.

Figure 12 is a section on the line 12—12 of Figure 9.

Figure 13 is a section on the line 13—13 of Figure 9.

The automobile, the subject of the present invention, has the usual wheels 1, carrying a supporting frame 2. Extending over the front wheels is a front fender 3, and extending over the rear wheels are rear fenders 4. The fenders on each side are connected by a runningboard 5.

Formed in the front fenders are headlights 7. The frame has thereon a body 8, with side doors 9. There may be one door to each side, as shown in Figure 1, or two doors in the case of the sedan shown in Figure 3. On the ends of the frame are bumpers 6.

The body is divided into various compartments, one constituting a seat compartment and the other a top-receiving compartment adapted to receive and inclose a rigid top 10, the front end of which is V-shaped and adapted to rest upon the top of the V-shaped windshield 11. The automobile has a hood composed of a pair of upper members 12, suitably pivoted together, and to each of these upper members is pivoted the side part 13 of the hood, which is adapted to cooperate with the front fender and a part 16 extending down from the front fender in inclosing the motor.

In front of the hood is a V-shaped radiator shell 14, which has in its front a lattice structure. Each side part 13 of the hood is bulged, as indicated by the numeral 15, and cooperates with the part 16 in forming a wheel housing or pocket. These parts are clearly shown in Figure 5.

In the form shown in Figures 3, 6 and 8 the side 13 of the hood is bulged uniformly to provide space for housing a spare wheel, as indicated by the numeral 15'. The part 15' of the hood extends forwardly and terminates in a splash apron 15a formed adjacent the inside of the front fender. In front of this splash apron 15a is located the headlight 7 in this form.

The wheel 17 is supported in the pocket or compartment by means of a bracket 18 mounted upon some suitable part of the frame 2. In order to protect the wheel from the heat of the motor a removable shield or guard 19 may be suitably attached to the frame, as shown in Figure 5. In this form the hood parts 12 and 13 move independently of the shield.

In the form shown in Figure 6 the removable shield 19' is articulately attached to the hood parts so that when the hood is elevated this shield is elevated with it, as shown in dotted line in this figure.

On top of the V-shaped windshield there is formed a seat 20 for seating and securely supporting the front end of the top 10 in the manner shown in Figure 1. In the form shown in Figure 3 the windshield and the top are formed together so there is no seat on the windshield for supporting the front end of the sedan top.

The compartment at the rear of the seat compartment has an opening 21 leading thereto, which may be closed by means of a guidable closure 22. In the bottom of the automobile, at each side of the body, is a plate 23 suitably attached to the frame or some part of the body. Each plate has extending upwardly therefrom a post 24, which has on its upper end a U-shaped bracket 25.

The outer arm of each U-shaped bracket is attached to the extreme rear of the top by means of a system of levers or an articulated mechanism 26, as clearly shown in Figures 9, 10 and 11. The other arm of the U-shaped bracket is connected by means of a system of levers or a second articulated mechanism 29 to the body, in front of the point where the other system of levers is attached. The system of levers 26 is attached to the bracket at the points 27 and is attached to the top at the point 28. The system of levers 29 is attached to the bracket at the points 30 and is attached to the top at the point 31.

Located within the top-receiving compartment is an arcuate guide and support member 32, which is attached at each side to a link 33 by means of rearwardly extending brackets 34. The upper end of each link 33 is attached to the upper end of a supporting link 35, while the lower end of each link is connected to the lower end of a link 36, which has its upper end attached to one arm of the U-shaped bracket 25.

On the front face of the guide and supporting member is a plurality of plates 37, suitably attached to the member and having their upper ends connected to the closure 22 by any suitable mechanism. By suitable manipulation of the guide and supporting member the closure 22 may move to close the opening 21, or it may move to open the opening 21. In the seat compartment is a seat 38 having a back 39. Forming a suitable support for the body, adjacent the top-receiving compartment, is a frame structure 40.

As shown in Figure 9, the top extends in a horizontal direction over the seat compartment with the front of the top supported on the V-shaped windshield. The opening 21 is closed by means of the closure 22. The guide and supporting member is in its forward position. By moving the guide and supporting member and the various links connected thereto backwardly, or toward the rear of the car, the closure is removed from the opening 21 to a point to the rear of the frame 40 and the rigid top may be tilted and caused to seat within the top-receiving compartment, as shown in Figure 10.

As shown in this figure the top is nested behind and beneath the seat. It will be observed from Figure 10 that the guide and support member is considerably to the rear of the top housed within the top-receiving compartment. By moving this guide and supporting member forward the closure is caused to move forward and close the opening 21 for concealing the rigid top within the top compartment. This guide and support member aids in directing and guiding the top as it is located within the top-receiving compartment, and when properly located within the top compartment it serves to hold the top in position and prevent its moving and rattling. The relative positions of the parts with the closure closing the opening 21 are shown in Figure 11.

When it is desired to withdraw the top from the top-receiving compartment the closure is caused to move backwardly so that the parts will assume the positions shown in Figure 10. The top may be caused to swing upwardly and in a forward direction, being supported and guided in its movement by the systems of levers, and when in a horizontal position the front part of the top will be supported on the upper edge of the V-shaped windshield.

It will be understood that I desire to comprehend within this invention such modifications as come within the scope of my claims and my invention.

Having thus fully described my invention, what I claim as new and desire to secure by Letters Patent, is:

1. In an automobile construction, a body having a compartment and an opening leading into the compartment, a rigid top, a system of levers supporting each side of the top on the body, whereby the top may be supported above the body or may pass through the opening into the compartment, and a support and guide member for the top in the compartment having means thereon for closing the opening, said support and guide member being supported on each side of the body by a plurality of links.

2. In an automobile construction, a body having a compartment and an opening leading into the compartment, a rigid top, a system of levers supporting each side of the top on the body, whereby the top may be supported above the body or may pass through the opening into the compartment, and a support and guide member for the top in the compartment having means thereon for closing the opening, said support and guide member being supported on each side of the body by a link pivotally supported at each end by a link.

3. In an automobile construction, a body having a compartment and an opening into the compartment, a top, an articulated mechanism for supporting the top and moving the top through the opening into the compartment, and a sliding closure for the opening, said closure having means in the compartment to guide and support the top in the compartment.

4. In an automobile construction, a body having a compartment and an opening into the compartment, a rigid top, an articulated mechanism for supporting the top on the body and moving the top through the opening into the compartment, a closure for the opening, and means in the compartment for supporting the closure, said means forming a guide and support for the top in the compartment.

5. In an automobile, a body having a seat and a compartment behind and below the seat, a rigid top having a horizontal and vertical portion articulated to the body and adapted to be moved from a point above the seat to a point behind and below the seat, an articulated slidable back for the compartment behind the seat to receive the top, a slidable cover connected therewith for covering the opening through which the top passes to and from its position behind and below the seat whereby when the top is in its lower position, the cover closes said opening and carries with it the back of said compartment closely adjacent to said top.

WILLYS P. WAGNER.